Patented Dec. 10, 1935

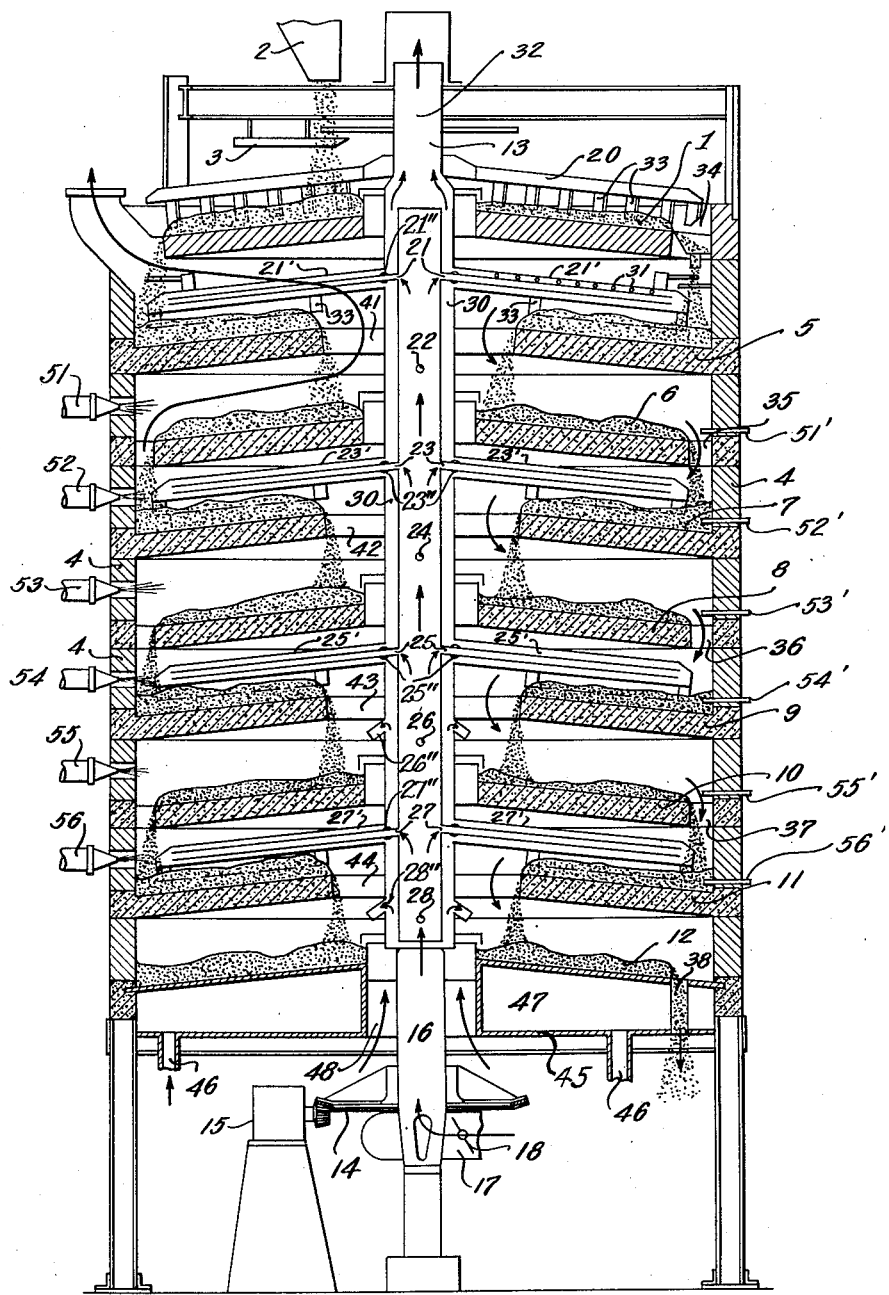

2,023,426

UNITED STATES PATENT OFFICE 2,023,426

METHOD FOR TREATMENT OF CERAMIC MATERIALS

Marshall Lasley, Chattanooga, Tenn.

Application February 8, 1933, Serial No. 655,701

12 Claims. (Cl. 25—156)

This invention relates to a method of preparing argillaceous clays and shales (which may contain impurities such as organic matter, sulfur, ferrous iron and the like, but more especially those which whether pure or impure are characterized by a high degree of plasticity) in a condition suitable for making brick, tile or similar ceramic articles therefrom.

Some natural clays are obtainable which are relatively pure and consist substantially entirely of clay substances or kaolin, while many if not most commercial plastic clays and shales which are economically suitable for general ceramic purposes contain appreciable proportions of impurities such as organic matter, iron, pyrites, free sulfur and frequently more or less ferrous iron. Of these impurities the organic matter and sulfur undergo combustion and volatilize, upon being subjected to high temperatures, which presents certain difficulties in the ordinary course of manufacturing ceramic ware therefrom. But whether pure or impure, the plastic clays contain a high proportion of colloidal matter which tends to form dense films and prevent the free escape of water vapor or of the gases resulting from such combustion and volatilization. Consequently, articles molded from such clays do not dry readily nor completely, and furthermore they tend to swell, crack or otherwise deteriorate upon being heated, especially if high temperatures be suddenly applied or the heating up of the ware be too rapid.

The ferrous iron component, if present, is undesirable because it serves to flux the clay prematurely and before the ultimate vitrification or hardening temperature has been reached.

In the purer clays, the plasticity which they manifest is primarily attributable to the highly hydrated clay substance or kaolin, which they contain; and in many impure clays also the greater part of the plasticity may be attributable to the hydrated clay component. Accordingly, in both pure and impure types of clays there is a basic plasticity factor or component composed of highly hydrated clay material. This component serves as the bonding agent of the clay both in the wet state and subsequently in the dried condition. It also effectively determines the structure and strength of the shaped ware during the firing operation and of the ultimately obtained product. If a clay were to contain but a small proportion of such hydrated plastic material (relative to the non-plastic components of the clay), it would serve to bond the unhydrated and less dense and less fusible components of the clay, leaving a more or less open or permeable structure. If the clay contains a large proportion of such hydrated plastic material, however, it tends not only to make the plastic mass dense and retard drying, but also to retard dehydration of the clay substance itself in the inner parts of the ware. It may also harden on the outside and resist the subsequent shrinkage or deformation which is incurred by the hardening and vitrifying of the inner portions of the ware during the later stages of the firing operations.

The general practice of preparing and firing ceramic products at the present time is to grind the raw clay to a sufficiently fine degree of subdivision (to facilitate convenience in shaping and finishing and also to develop plasticity), to moisten or mix the clay thoroughly with water, either during or after the grinding operation, to shape the plastic mass to the desired form, then to dry and subject the shaped product to the kiln operations required to drive off mechanical water, impurities and chemically combined water and finally to develop its ultimate mechanical strength.

In such procedures, the kiln operations are usually carried out in a tunnel or periodic kiln and comprise a preliminary "water-smoking" period, during which the temperature is kept relatively low so that it only gradually expels the mechanically retained water from the fresh or "green" charge of ware. This operation in periodic kilns, for example, may require one and one-half days or more. When completed, the temperature of the kiln may be raised gradually, to a sufficient degree (e. g. 1450° F.) to oxidize and slowly expel the various volatile materials which are contained in the raw clay, such as organic matter, sulfur, and the like. To thus raise the temperature of the kiln the heating must be increased gradually, usually requiring half a day, and the ware is held at such temperature for three days, more or less, in order to complete the reaction. Moreover, this heating must be done with extreme care in order to avoid rapid changes or reactions and the consequent danger of cracking, swelling, warping, shrinking, blistering, spalling, etc., which are likely to occur during this stage. The kiln may then be raised to a sufficient temperature (e. g. 1850° F.) for firing or vitrifying the ware. Such rise of temperature requires another half day and the ware is then held at this firing or vitrification temperature for such time as may be required to develop its bonding strength, which is usually two to two and one-half days. Such increase of temperature and firing of the ware must also be very carefully conducted in order to avoid cracking, warping, checking, spalling, etc., which may occur,—and especially to compensate for any non-uniformity or incompleteness of the preceding operations. The kiln is then allowed to cool gradually and finally opened for the removal of the ware at such temperature as experience shows that the ware may be exposed directly to the atmosphere without cracking, checking or otherwise deteriorating.

It will be evident that in such procedure the molded ware—which has already received the labor of being shaped and dried—must be carefully carried through three separate stages, and especially carefully through the third or vitrification stage of heat treatment, after it has been loaded into the kiln. Throughout these stages of treatment the condition of the ware can not be observed (except at isolated points through spaced peep-holes) and substantially no direct or immediate control over the actual temperatures to which it is being subjected is practically possible. Consequently, in such heat treatment, not only may the ware be subjected to violent physical and chemical changes but these can be only partially modified and controlled by employing very gradual and prolonged periods of time for effecting each rise of temperature of the kiln and by holding each intermediate temperature for a safe interval before continuing the rise of temperature in the kiln.

The first or water smoking stage is allowed for all ware which contains a high content of mechanically occluded water, in order that the water may be completely expelled.

The first stage is followed by a second stage in which, with ware made from clays or shales containing impurities, the impurities of the clay are expelled. Dehydration or liberation of the chemically retained water of hydration of the clay proceeds with or follows the oxidation and vaporization of the combustible impurities in the clay. Finally, the hardening or vitrification of the ware is effected which develops its mechanical strength.

In each of such stages, the physical changes or chemical reactions tend to deform and destroy the ware, as by unequal or excessive shrinkage, swelling, warping, fusing, spalling, cracking, blistering, and the like. In addition to these difficulties of control is the economical consideration that a single charge requires the continuous use of a kiln for some seven or eight days, without including the time for loading and unloading the ware from the kiln.

It is now conceived that if a clay were of high purity and contained just the right ratio of plastic clay (after reducing to workable condition), ware made therefrom might be prepared and heated in the kiln directly to the ultimate firing or vitrification temperature and the dehydration of the plastic clay content would proceed uniformly to completion, that is, neither faster nor slower than the progressive development of the porosity required for the escape of the resulting vapors and gases. But such accurate adjustment of properties in the naturally occurring clay is only hypothetical and is never encountered. It might be presented, in some degree, by lean clays; but such clays do not have suitable working properties. On the other hand, highly hydrated plastic clays contain too large a proportion of combined water to be disposed of during the burning operation and present the difficulties outlined above. Some clays have had their plasticity reduced by preliminary heat treatment of the same in the condition in which they come from the mine. But with a clay which has been thus prepared in lumps,—even though it be relatively pure in its natural state and has been partially dehydrated by heat treatment,—will retain localized concentrations of undehydrated and unpurified clay substance which are slow to become dehydrated especially when contained within the walls of ware which has been shaped therefrom, and will, moreover, retain impurities.

Likewise impure clay which has been comminuted to a state of fine subdivision and subjected to oxidizing treatment at relatively high temperatures, for a short period of time, as set forth in my application Serial No. 529,283, filed April 10, 1931, which has become Patent 1,906,384 of which this is a continuation in part,—may, in the case of a very highly hydrated clay, manifest a higher plasticity factor than is necessary for developing suitable strength of the ware or desired for rapid drying, and retain a higher proportion of chemically hydrated clay substance which prevents a sufficiently uniform penetration of heat and a sufficiently rapid permeation and escape of the evolved vapors of the water of hydration therefrom before the stiffening and hardening or vitrification of the clay has set in. It may, moreover, induce skin effects in such dehydrating areas which tend to retard the dehydrating operation and the subsequent hardening and vitrification stages. Even in the third state of firing or vitrification treatment (if the heating is too rapid) the ware may be subjected to appreciable checking or cracking. This is due to shrinkage throughout the dried mass and inability of the hardening or vitrifying clay to yield to such shrinkage stresses and strains resulting from dehydration of residues of plastic clay substance.

This may occur with clays which are naturally relatively pure, but which contain a high proportion of chemically hydrated kaolinite or clay substance, especially if it possesses or acquires a colloidal consistency. It may likewise occur in clays which originally contain organic matter but from which the organic matter and other combustible and volatile matter has been removed by preliminary oxidation, if the clay contains a high proportion of plastic hydrated kaolinite or clay substance and such is retained during the oxidizing treatment.

It is, therefore, an object of this invention to prepare an improved ceramic composition from naturally occurring raw materials which are characterized by having a high degree of plasticity, due to the presence of a large proportion of hydrated clay substance or kaolinite and which may or may not contain volatilizable impurities. It is at the same time an object to obtain a ceramic material of improved quality (with respect to ceramic operations to be conducted therewith) and of greater uniformity. Other objects will appear from the following disclosure.

In the method of the present invention the raw material, which may be a pure or impure clay or shale, but characterized by high plasticity, is first crushed and reduced to a fine state of subdivision (e. g. ⅛″ or less in at least one dimension) which may contain some particles of the order of granules but preferably consists in large part of free dust or powder approaching and including colloidal dimensions.

In some cases, it may be necessary to dry the raw material before or during such reducing treatment, which facilitates the dispersion of the clay particles to form an open, finely divided mass. It is then subjected to a heat treatment (e. g. 800° F. more or less) which is adapted on the one hand first to expel mechanical water and then to effect the combustion and volatilization of oxidizable components such as organic matter, sulfur, etc., which it may contain. If carried to somewhat higher temperatures (e. g. approximately 1400° F.), it is effective to oxidize iron pyrites and to convert ferrous compounds, if present, to the ferric state in a very short interval of time.

Such heat treatment is applied to the pulverized raw material, preferably while in a dispersed or extended condition so that the surfaces are freely and completely exposed (as by agitation) to an oxidizing atmosphere, as for example, by spreading out in thin layers and in intimate contact with a circulating stream of air.

If the heat treatment is limited to a brief interval of time and a relatively high temperature employed, it will be effective to accomplish the desired oxidation and removal of impurities without appreciably affecting the plasticity of the material under treatment, as disclosed in my copending application alluded to above. Then, upon being moistened, the treated and purified material presents the characteristics not only of being practically free of organic matter, sulfur, pyrites and ferrous iron, but also of having substantially its original plasticity. If held at such higher temperatures for a prolonged period of time, however, it is now found that the plastic clay substance or hydrated kaolin component is gradually dehydrated and thereby rendered non-plastic. In some clays, in which the plasticity is not great, reduction of plasticity may not be required. In others, however, where the plasticity is higher than necessary for suitable working consistency, it will be desirable to reduce it. Such reduction of plasticity is found especially effective to render the clay more open and permeable for the escape of water vapor and occluded gases, to decrease shrinkage and warping, and to compensate for changes during the hardening and vitrification—(without the separate preparation and addition of ceramic materials of different characteristics, such as grog, which is sometimes resorted to) in the subsequent manipulation of this type of clays.

By such prolongation of the preliminary, dehydrating heat treatment, the degree of elimination of the water of hydration and hence the residual proportion of chemically hydrated clay substance can be definitely controlled and determined, while in dispersed condition, and without inducing vitrification or incipient fusion between the clay particles. The resulting clay therefore will remain dispersed and will be found to be in part dehydrated and in part still inherently plastic, but as to an individual particle it will be substantially entirely the one or the other. There will be no lumps or sizable granules which will present the condition of a dehydrated outer portion and a hydrated center portion. The proportions of those particles which are dehydrated and those which are not will be determined by the extent to which the treatment is carried. As a result, the ceramic material thus prepared, whether pure or impure, is liberated from a large part of its potentially volatile components, including water of hydration contained in the clay substance or kaolinite component, so that the remaining proportion of plastic clay substance may be definitely determined. Hence the treated clay may be mixed with water in the usual way, either in small amounts as for dry pressing, or with as much as may be desired for the shaping operations, and shaped to the required form and then dried if necessary, or desired. It is a novel characteristic of such clay that, if naturally impure it is substantially freed therefrom and if naturally highly plastic, its plasticity is reduced to render it especially applicable for the desired molding, etc. operations. It is a further characteristic that, though freely moldable and retentive of its molded shape, it dries rapidly and completely, so that frequently, when the plasticity component has been appreciably lowered, such preliminary drying may be omitted. The shaped articles may then be loaded into the kiln and, without the usual low temperature treatments and gradual heating of the kiln, the temperature of the kiln may be raised rapidly and continuously to the ultimate firing temperature.

A typical example of the method of the invention will be described, as carried out in a multiple hearth type of furnace, as illustrated in the accompanying drawing in which:

Fig. 1 is a diametrical cross-section of a multiple hearth furnace.

The raw clay or shale to be treated is first ground to a relatively fine particle size (e. g. to pass through an 8 mesh screen) and is also dried, if necessary, so as to facilitate handling. If it is moist or compact, it may be desirable and more economical to let it dry in the atmosphere, or alternately to reduce the material in successive stages, with intermediate drying to facilitate the next step of crushing or grinding, until the entire supply has been reduced to a finely divided condition.

The raw material, as thus prepared, is fed onto the top (exterior) hearth 1, of the furnace, preferably in a loose but uniform stream, from the hopper 2, and may be further distributed thereover by striking a baffle plate 3.

The furnace is generally cylindrical, having an outer wall 4 in which the successive, substantially horizontal hearths 5, 6, 7, 8, 9, 10, 11 and 12, respectively, are mounted in vertically spaced relationship one over the other. The central portion of each hearth is open to receive a vertical shaft 13, which is mounted for rotation by suitable gears 14 and motor 15. The shaft 13 comprises an inner hollow tube 16, to which a current of air may be supplied through duct 17 controlled by valve 18. Shaft 13 is also provided (at spaced intervals corresponding to the hearths of the furnace), with a plurality of hollow, open-ended radial arms 21, 22, 23, 24, 25, 26, 27, and 28 which are severally centrally disposed in perforated arms 21', 23', 25', 27' (and also other perforated arms not shown because they extend rearwardly from the shaft openings and hence do not show in the cross sectional view of the drawing) which extend radially from the outer shaft 13. The latter is fixed to and rotates with the inner shaft 16, forming an annular space 30 therebetween, into which excess of air from the radial arms may escape (as well as through perforations 31 onto the hearths) and pass upwardly and out at the top of the furnace 32. The perforated arms 21', etc. have deflecting vanes or flanges 33 attached along the under side. On the top hearth of the furnace (1) a set of scraper arms 20 with similar vanes 33 thereon is mounted upon the shaft 13 but is not provided with inner connection with the shaft 16 nor with perforations. The top hearth 1 is provided with peripheral openings 34, and likewise hearths 6, 8, 10, have peripheral openings 35, 36, 37 therein, while hearth 12 has a single peripheral opening 38. Alternate hearths 5, 7, 9, and 11 have central openings 41, 42, 43 and 44. The bottom hearth 12 may be enclosed by a false bottom 45, having openings 46, through which cooling or heating air may be introduced into and through the chamber 47.

Burners 51, 52, 53, 54, 55, 56, which may be suitable for burning either oil or gas and controllable in respect of both fuel and air supply, are mounted in the side walls, and preferably slightly above each hearth, or alternate hearth. Additional air supply may also be introduced above each hearth through outlets from the annular air space 30. Cooling air may also be introduced at 48 into the bottom of the annular duct 30, as shown.

In operation, the integral shafts 13 and 16, with associated scraper arms are set in motion and slowly rotated by the motor 15. The burners 51, 52, 53, 54,—or certain of them as may be required,—are also operated and adjusted to provide a clear and preferably oxidizing flame above the respective hearths. Air may also be forced through the shaft 16 by suitable fan means (not shown). The temperatures on the successive hearths is preferably determined by temperature indicators such as pyrometers 51', 52' etc., which are preferably so located as to record the temperature of the clay under treatment adjacent to each of the hearths. The temperatures are then severally adjusted to those required for the treatment of the clay,—some allowance being made for the absorption (or evolution) of heat by the clay to be treated.

The finely divided clay is then sifted loosely upon the top hearth 1 where it is both agitated and gradually carried across the hearth by the scraper arm 20 and deflecting vanes 33, to the periphery where it falls through openings 34 onto the outer edge of hearth 5. At this stage or upon this hearth, the clay will have lost or will lose some of its mechanically retained or adsorbed water. The individual particles are, accordingly, thus rendered somewhat more permeable to the furnace gases and heat and being relatively small, the oxidizing gases of the furnace will progressively penetrate more freely.

On the first hearth, for example, a temperature up to 300°–500° F. may be attained depending upon the condition of the clay. Volatile matter is substantially removed and residual traces of moisture and absorbed gases may be expelled.

The clay is meanwhile gradually swept toward the middle of the hearth where it falls through the central opening 41 onto hearth 6. Here it is agitated and carried toward the periphery by the arms 22 (not shown because at right angles to the cross-section of the drawing). The temperature of the clay is increased, combustion of contained impurities is promoted (by the heat from the burners and air from the perforated arms) and the products of combustion expelled. The resulting clay particles hence become even more permeable. But at this stage, and in fact during its passage over several hearths of the furnace in normal operation, the clay will not have lost any appreciable proportion of its chemically combined water or water of constitution, and, if withdrawn at such early stage of treatment, it would not manifest any appreciable reduction in plasticity.

Thus hearth 6 may acquire a temperature of 600°–700° F. without operating the burners 51, and the temperature on the next hearths 7 and 8 may be maintained in the vicinity of 800° F.– 950° F. With normal operation of the kiln (e. g. 2–3 revolutions per minute) the clay will be fed across each of these hearths in approximately 2 to 3 minutes. Hence, in this brief interval of time, although the clay is substantially purified, it is found that the hydrated clay substance is not dehydrated and hence its plasticity is not lowered. With clays of high plasticity, however, or clays containing a high proportion of plastic clay substances, it is desirable to reduce such excessive plasticity. At the same time it is desirable not to dehydrate the clay completely nor to effect hardening of the same. This is accomplished by raising the temperature for a short time and/or holding the charge at a dehydrating temperature for a predetermined longer period of treatment.

To this end, hearths 9 and 10 may be heated to such dehydrating temperatures (e. g. 1450° F.) by corresponding adjustment of the burners. Hearths 11 and 12 may also be heated, but usually it is more convenient to permit the treated clay to cool on these hearths (e. g. to 400° F. more or less) before being withdrawn at 38. This permits the clay particles to contract and thus reduces, to some extent, their permeability and loss or adsorption of moisture upon exposure to the atmosphere.

By thus regulating the temperatures of the succeeding hearths, after the mechanically retained water has been removed and the combustible impurities have been oxidized and expelled, the degree of dehydration of the clay substance may be definitely controlled. The resulting product is accordingly composed of uniformly purified material and contains a predetermined proportion of still plastic clay substance and a corresponding proportion of dehydrated, non-plastic clay substance. The plastic clay substance serves as a bond, upon being mechanically moistened with water, and also serves as the more active bonding agent throughout the molding, drying, firing, and vitrifying stages, when the treated clay is used for making ceramic ware in the customary procedure of the art. With such clay, however, the deterioration of ware above noted, which is attributable to impurities, the escape of gases and volatile matter, non-uniform hardening and shrinking, etc., as above pointed out, are avoided. Furthermore, on account of the lesser proportion of plastic, hydrated clay substance present, there is less evolution of chemically combined water to be expelled and at the same time greater permeability of the mass to permit its uniform and rapid escape (from the inner as well as the outer portions) without setting up unequal strains and stresses in the shaped ware or opposing external vitrification.

As a result of these improved constitutional and structural properties of clay prepared by the foregoing preliminary treatment, ceramic products may be shaped therefrom and either directly, or after only a short drying treatment, loaded into a kiln and the temperature raised rapidly to the firing or vitrifying point, without danger of destroying the ware or deleteriously affecting the quality of the finished product obtained.

I claim:

1. Method of treating clay or shales containing volatilizable impurities and a high proportion of hydrated, plastic clay substance, comprising reducing the same to finely divided condition and subjecting to heat in intimate contact with an oxidizing atmosphere, at a temperature sufficient to oxidize and volatilize the impurities and thereafter at a temperature sufficient partially to dehydrate the clay substance.

2. Method of treating clay or shales containing oxidizable and volatilizable impurities and a high proportion of hydrated, plastic clay substance, comprising reducing the same to a finely divided condition, subjecting to heat in intimate contact with an oxidizing atmosphere, at a temperature sufficient to oxidize and volatilize the impurities and to dehydrate the clay substance, and controlling the degree of dehydration by regulating the time of such treatment.

3. Method of treating ceramic material containing a high proportion of hydrated plastic clay substance, comprising reducing the same to a finely divided condition, subjecting a thin layer of the finely divided material to heat to expel volatile matter and to a dehydrating temperature, and controlling dehydration by the time of treatment.

4. Method of treating ceramic material containing a high proportion of hydrated plastic clay substance, comprising reducing the same to a finely divided condition, subjecting a thin layer of the finely divided material to heat to expel volatile matter and to a dehydrating temperature and controlling dehydration by the temperature of treatment.

5. Method of treating ceramic material containing a high proportion of hydrated plastic clay substance, comprising reducing the same to a finely divided condition, subjecting a thin layer of the finely divided material to heat to expel volatile matter and to a dehydrating temperature, and controlling dehydration by the time and temperature of treatment.

6. Method of treating ceramic material containing a high proportion of hydrated plastic clay substance, comprising reducing the same to a finely divided condition, agitating and heating to expel volatile matter, and thereafter heating to a dehydrating temperature.

7. Method of treating ceramic material containing a high proportion of hydrated plastic clay substance, comprising reducing the same to a finely divided condition, agitating and heating to expel volatile matter and thereafter to a dehydrating temperature, and controlling dehydration by regulating the time and agitation treatment.

8. Method of treating ceramic material containing a high proportion of hydrated plastic clay substance, comprising reducing the same to a finely divided condition, agitating and heating to expel volatile matter and thereafter to a dehydrating temperature, and controlling dehydration by regulating the temperature and agitation treatment.

9. Method of treating ceramic material containing a high proportion of hydrated plastic clay substance, comprising reducing the same to a finely divided condition, agitating and heating to expel volatile matter and thereafter to a dehydrating temperature, and controlling dehydration by regulating the time and temperature of the agitation treatment.

10. Method of treating ceramic material containing a high proportion of hydrated plastic clay substance, comprising reducing the same to a finely divided condition, subjecting a thin layer of the finely divided material to a dehydrating temperature, controlling dehydration by the temperature of treatment, shaping the resulting material to the desired form and heating directly to the firing temperature of the ware.

11. Method of treating ceramic material containing a high proportion of hydrated plastic clay substance, comprising reducing the same to a finely divided condition, subjecting to a dehydrating temperature and to agitation, controlling dehydration by the temperature of treatment, shaping the resulting material to the desired form and heating directly to the firing temperature of the ware.

12. Method of treating ceramic material containing volatilizable impurities and a high proportion of hydrated plastic clay substance, comprising reducing the same to a finely divided condition, subjecting to an oxidizing and to a dehydrating temperature and to agitation, controlling dehydration by the temperature of treatment, shaping the resulting material to the desired form and heating directly to the firing temperature of the ware.

MARSHALL LASLEY.